(12) United States Patent
Shen et al.

(10) Patent No.: US 11,880,367 B2
(45) Date of Patent: Jan. 23, 2024

(54) METHOD AND APPARATUS FOR REALIZING GLOBALLY UNIQUE INDEX

(71) Applicant: ZTE CORPORATION, Guangdong (CN)

(72) Inventors: Yang Shen, Guangdong (CN); Yifang Yu, Guangdong (CN); Qinyuan Lu, Guangdong (CN); Chen Qi, Guangdong (CN); Da Lv, Guangdong (CN)

(73) Assignee: XI'AN ZHONGXING NEW SOFTWARE CO., LTD., Shaanxi (CN)

(*) Notice: Subject to any disclaimer, the term of this patent is extended or adjusted under 35 U.S.C. 154(b) by 202 days.

(21) Appl. No.: 17/622,794

(22) PCT Filed: Mar. 31, 2020

(86) PCT No.: PCT/CN2020/082488
§ 371 (c)(1),
(2) Date: Dec. 24, 2021

(87) PCT Pub. No.: WO2020/258965
PCT Pub. Date: Dec. 30, 2020

(65) Prior Publication Data
US 2022/0245152 A1     Aug. 4, 2022

(30) Foreign Application Priority Data
Jun. 26, 2019   (CN) .......................... 201910561595.0

(51) Int. Cl.
*G06F 16/2455*  (2019.01)
*G06F 16/27*    (2019.01)
(Continued)

(52) U.S. Cl.
CPC .... *G06F 16/24553* (2019.01); *G06F 16/2228* (2019.01); *G06F 16/2282* (2019.01); *G06F 16/2358* (2019.01); *G06F 16/27* (2019.01)

(58) Field of Classification Search
CPC ................................................ G06F 16/24553
(Continued)

(56) References Cited

U.S. PATENT DOCUMENTS

| 10,133,767 | B1 * | 11/2018 | Cole | ................... G06F 16/2379 |
| 10,521,449 | B1 * | 12/2019 | Schwartz | ............ H04L 67/1095 |
| 2012/0278282 | A1 * | 11/2012 | Lu | .......................... G06F 16/273 |
| | | | | 707/634 |

FOREIGN PATENT DOCUMENTS

| CN | 101377775 A | 3/2009 |
| CN | 105677915 A | 6/2016 |

(Continued)

OTHER PUBLICATIONS

Teverenz et al., "Oracle8 Concepts Release 8.0", Dec. 1, 1997, 804 pgs. Retrieved from the Internet: URL:http://docs.oracle.com/cd/A64702_01/doc/server.805/a58227.pdf.
(Continued)

*Primary Examiner* — Muluemebet Gurmu
(74) *Attorney, Agent, or Firm* — Li & Cai Intellectual Property (USA) Office

(57) ABSTRACT

Disclosed in embodiments of the present disclosure are methods and apparatuses for realizing a globally unique index, which are applicable to a distributed database. One of the methods includes: receiving a structured query language, SQL, request, obtaining a conflict detection SQL statement corresponding to the SQL request and calculating an expected value; issuing the conflict detection SQL statement to each database node for execution; obtaining an execution result of the conflict detection SQL statement, and comparing the execution result of the conflict detection SQL
(Continued)

statement with the expected value; and when the execution result of the conflict detection SQL statement is less than or equal to the expected value, processing an original SQL statement of the SQL request, and issuing the original SQL statement to the each database node for execution.

10 Claims, 10 Drawing Sheets

(51) Int. Cl.
*G06F 16/22* (2019.01)
*G06F 16/23* (2019.01)

(58) Field of Classification Search
USPC .......................................................... 707/769
See application file for complete search history.

(56) References Cited

FOREIGN PATENT DOCUMENTS

| | | |
|---|---|---|
| CN | 105868210 A | 8/2016 |
| CN | 106547781 A | 3/2017 |

OTHER PUBLICATIONS

ZTE Corporation, Extended European Search Report, EP 20831286.8 dated Jul. 7, 2022, 9 pgs.
ZTE Corporatioin, International Search Report with English Translation, PCT/CN2020/082488, dated Jun. 18, 2020, 6 pgs.

\* cited by examiner

METHOD AND APPARATUS FOR REALIZING GLOBALLY UNIQUE INDEX

CROSS REFERENCE TO RELATED APPLICATIONS

The present application is a United States National Stage Application filed under 35 U.S.C. § 371 of PCT Patent Application Serial No. PCT/CN2020/082488, filed Mar. 31, 2020, which claims priority to Chinese patent application No. 201910561595.0, filed Jun. 26, 2019, each of which is incorporated by reference herein in its entirety.

TECHNICAL FIELD

Embodiments of the present disclosure relate to, but are not limited to, the database field, and more particularly to a method and an apparatus for realizing a globally unique index.

BACKGROUND

A distributed database includes a plurality of database nodes. Each of the plurality of database nodes is independent of each other. A single database node can guarantee the uniqueness of a unique index in this database. However, when all the database nodes are combined into the distributed database, the uniqueness of the unique index in the distributed database may not be guaranteed. At present, the uniqueness of the unique index in the distributed database is usually guaranteed by a service level, that is, data that causes conflicts may not be modified or inserted. Such an approach may increase the complexity of the service, and the availability of the distributed database is not high. If a service error leads to conflicts, the distributed databases may not guarantee the correctness of data.

SUMMARY

In view of this, some embodiments of the present disclosure provide a method for realizing a globally unique index, applicable to a distributed database, including: receiving a structured query language, SQL, request, obtaining a conflict detection SQL statement corresponding to the SQL request and calculating an expected value; issuing the conflict detection SQL statement to each database node for execution; obtaining an execution result of the conflict detection SQL statement, and comparing the execution result of the conflict detection SQL statement with the expected value; and when the execution result of the conflict detection SQL statement is less than or equal to the expected value, processing an original SQL statement of the SQL request, and issuing the original SQL statement to the each database node for execution.

Some embodiments of the present disclosure provide a method for realizing a globally unique index, applicable to a distributed database, including: receiving a structured query language, SQL, request, processing an original SQL statement of the SQL request, and issuing the original SQL statement to each database node for execution; obtaining an execution result of the original SQL statement, and obtaining a conflict detection SQL statement corresponding to the SQL request and calculating an expected value; issuing the conflict detection SQL statement to the each database node for execution; obtaining an execution result of the conflict detection SQL statement, and comparing the execution result of the conflict detection SQL statement with the expected value; and when the execution result of the conflict detection SQL statement is less than or equal to the expected value, sending the execution result of the original SQL statement.

Some embodiments of the present disclosure further provide an apparatus for realizing a globally unique index, applicable to a distributed database, including a first obtaining unit, a first issuing unit, a second obtaining unit and a second issuing unit. The first obtaining unit is configured to receive a structured query language, SQL, request, obtain a conflict detection SQL statement corresponding to the SQL request and calculate an expected value. The first issuing unit is configured to issue the conflict detection SQL statement to each database node for execution. The second obtaining unit is configured to obtain an execution result of the conflict detection SQL statement and compare the execution result of the conflict detection SQL statement with the expected value. The second issuing unit is configured to process an original SQL statement of the SQL request and issue the original SQL statement to the each database node for execution when the execution result of the conflict detection SQL statement is less than or equal to the expected value.

Some embodiments of the present disclosure further provide an apparatus for realizing a globally unique index, applicable to a distributed database, including: a first issuing unit, a first obtaining unit, a second issuing unit, a second obtaining unit and a sending unit. The first issuing unit is configured to receive a structured query language, SQL, request, process an original SQL statement of the SQL request and issue the original SQL statement to each database node for execution. The first obtaining unit is configured to obtain an execution result of the original SQL statement and obtain the conflict detection SQL statement corresponding to the SQL request and calculate an expected value. The second issuing unit is configured to issue the conflict detection SQL statement to each database node for execution. The second obtaining unit is configured to obtain an execution result of the conflict detection SQL statement and compare the execution result of the conflict detection SQL statement with the expected value. The sending unit is configured to send the execution result of the original SQL statement when the execution result of the conflict detection SQL statement is less than or equal to the expected value.

Some embodiments of the present disclosure further provide an apparatus for realizing a globally unique index, applicable to a distributed database. The apparatus includes a memory, a processor and a computer program stored on the memory and executable on the processor. The computer program, when executed, causes the processor to implement the method for realizing a globally unique index described in any one of the above.

Some embodiments of the present disclosure further provide a computer-readable storage medium storing an information processing program. The information processing program, when executed, causes a processor to implement the method for realizing a globally unique index described in any one of the above.

Other features and advantages of the present disclosure will be described in the following specification, and partly become obvious from the specification, or understood by implementing the present disclosure. The purpose and other advantages of the present disclosure may be realized and obtained through a structure specifically pointed out in the specification, claims and drawings.

BRIEF DESCRIPTION OF THE DRAWINGS

The accompanying drawings are used to provide a further understanding of the technical scheme of the present disclosure, and constitute a part of the specification. Together with the embodiments of the present disclosure, they are used to explain the technical scheme of the present disclosure, and do not constitute a limitation to the technical scheme of the present disclosure.

DETAILED DESCRIPTION

The embodiments of the present disclosure may be described in detail below with reference to the accompanying drawings in order to make the objectives, technical solutions and advantages of the present disclosure clearer. It should be noted that the embodiments in the present disclosure and the features in the embodiments may be combined with each other to derive other embodiments not explicitly described.

The steps shown in the flowcharts of the accompanying drawings may be executed in a computer system, such as a set of computer-executable instructions. Although a logical order is shown in the flowchart, in some cases, the steps shown or described may be executed in a different order than here.

A distributed database system includes a client, a middleware and a database cluster. Herein, the middleware is mainly configured to receive a structured query language (SQL) access request sent by the client, parse and optimize the SQL, complete an aggregation of SQL results, and control a distributed transaction. The database cluster is configured to actually store data, execute an atomic SQL operation and control a local transaction. Each database cluster includes a plurality of data storage nodes, and the data is segmented according to certain rules and stored in respective data storage nodes. Tables in the distributed database have two concepts: distribution attributes and distribution nodes. According to different distribution attributes, the tables may be classified into replication tables, hash tables, list tables and range tables. The distribution nodes indicate which storage nodes the data tables are distributed on.

The existing distributed database can only ensure that a unique index on a single node does not conflict, but not globally. In order to realize a globally unique index function of the distributed database, in the absence of relevant solutions at present, some embodiments of the present disclosure provide a method and an apparatus for realizing a globally unique index. The technical schemes according to the embodiments of the present disclosure are explained below in detail through several embodiments.

Figure 1:
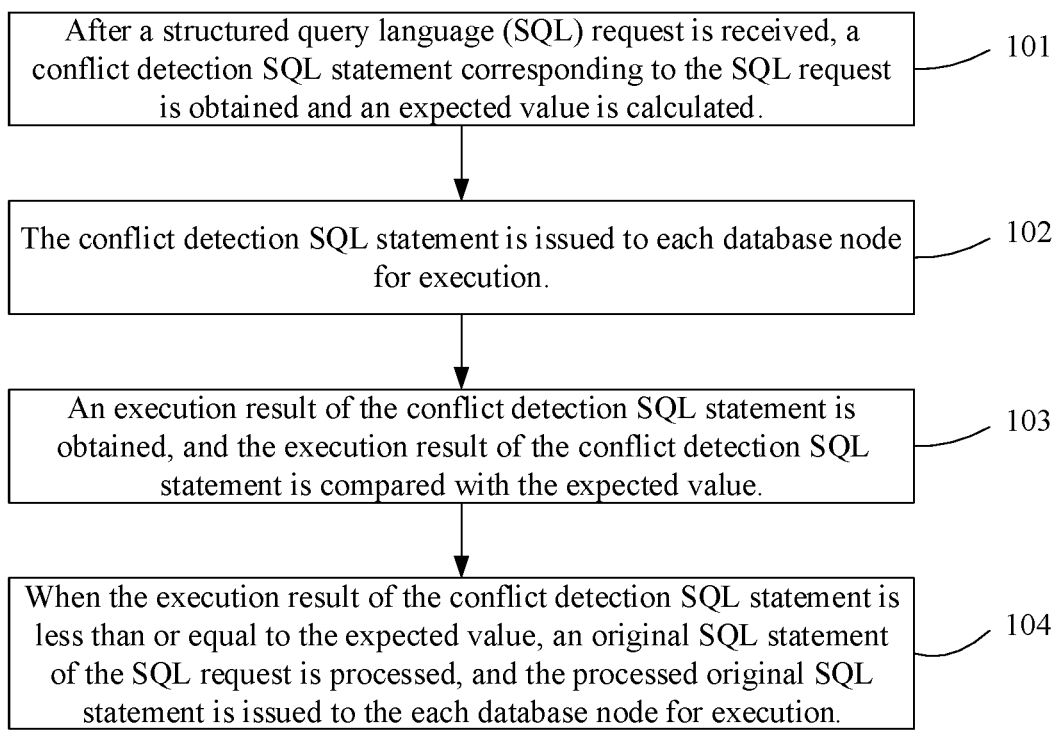
FIG. 1 is a schematic flow chart of a method for realizing a globally unique index according to an embodiment of the present disclosure.

FIG. 1 is a schematic flow chart of a method for realizing a globally unique index according to an embodiment of the present disclosure. As shown in FIG. 1, the method includes the following steps.

In step 101, after a structured query language (SQL) request is received, a conflict detection SQL statement corresponding to the SQL request is obtained and an expected value is calculated.

In step 102, the conflict detection SQL statement is issued to each database node for execution.

In step 103, an execution result of the conflict detection SQL statement is obtained, and the execution result of the conflict detection SQL statement is compared with the expected value.

In step 104, when the execution result of the conflict detection SQL statement is less than or equal to the expected value, an original SQL statement of the SQL request is processed, and the processed original SQL statement is issued to the each database node for execution.

In an example, obtaining the conflict detection SQL statement corresponding to the SQL request includes the following steps.

When the SQL request is an insert request, it is determined whether an insert field of the insert request includes the globally unique index. When the insert field of the insert request includes the globally unique index, a globally unique index field and an insert field value are spliced to form the conflict detection SQL statement. Herein, a where condition of the conflict detection SQL statement is that the globally unique index field is equal to the insert field value.

When the SQL request is an update request, it is determined whether an update field of the update request includes the globally unique index. When the update field of the update request includes the globally unique index, the globally unique index field and an update field value are spliced to form the conflict detection SQL statement. Herein, the where condition of the conflict detection SQL statement is that the globally unique index field is equal to the update field value.

Herein, one globally unique index is spliced with one conflict detection SQL statement.

In an example, obtaining the conflict detection SQL statement corresponding to the SQL request includes the following steps.

When the SQL request is an update request, it is determined whether an update field of the update request includes the globally unique index. When the update field of the update request includes the globally unique index, a globally unique index field, an update field value and a newly added field are spliced to form the conflict detection SQL statement. Herein, a where condition of the conflict detection SQL statement is that the globally unique index field is equal to the update field value, and the newly added field is equal to the update field value.

Herein, one globally unique index is spliced with one conflict detection SQL statement. The newly added field is a field added to a database table with a same field number and a same type as those of the globally unique index field.

In an example, when the execution result of the conflict detection SQL statement is larger than the expected value, a data rollback is performed.

Figure 2:
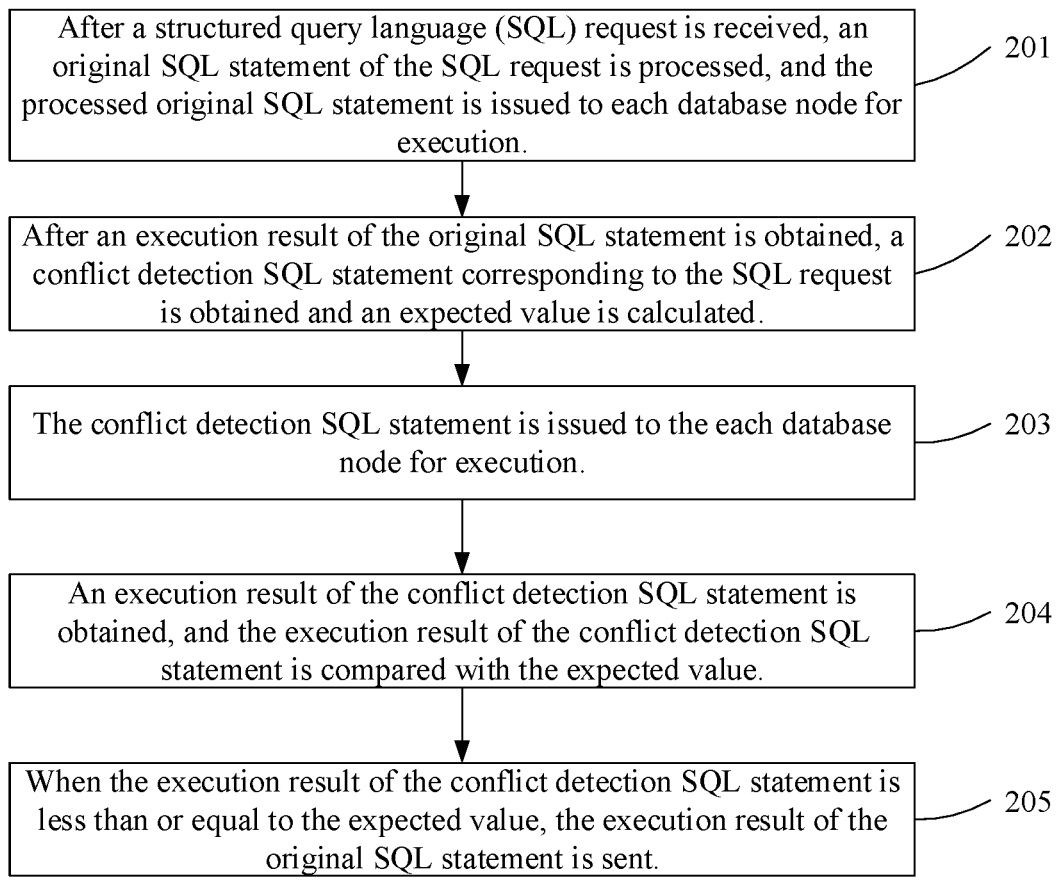
FIG. 2 is a schematic flow chart of a method for realizing a globally unique index according to another embodiment of the present disclosure.

FIG. 2 is a schematic flow chart of a method for realizing a globally unique index according to another embodiment of the present disclosure. As shown in FIG. 2, the method includes the following steps.

In step 201, after a structured query language (SQL) request is received, an original SQL statement of the SQL request is processed, and the processed original SQL statement is issued to each database node for execution.

In step 202, after an execution result of the original SQL statement is obtained, a conflict detection SQL statement corresponding to the SQL request is obtained and an expected value is calculated.

In step 203, the conflict detection SQL statement is issued to the each database node for execution.

In step 204, an execution result of the conflict detection SQL statement is obtained, and the execution result of the conflict detection SQL statement is compared with the expected value.

In step 205, when the execution result of the conflict detection SQL statement is less than or equal to the expected value, the execution result of the original SQL statement is sent.

In an example, obtaining the conflict detection SQL statement corresponding to the SQL request includes the following steps.

When the SQL request is an insert request, it is determined whether an insert field of the insert request includes the globally unique index. When the insert field of the insert request includes the globally unique index, a globally unique index field and an insert field value are spliced to form the conflict detection SQL statement. Herein, a where condition of the conflict detection SQL statement is that the globally unique index field is equal to the insert field value.

When the SQL request is an update request, it is determined whether an update field of the update request includes the globally unique index. When the update field of the update request includes the globally unique index, the globally unique index field and an update field value are spliced to form the conflict detection SQL statement. Herein, the where condition of the conflict detection SQL statement is that the globally unique index field is equal to the update field value.

Herein, one globally unique index is spliced with one conflict detection SQL statement.

In an example, obtaining the conflict detection SQL statement corresponding to the SQL request includes the following steps.

When the SQL request is an update request, it is determined whether an update field of the update request includes the globally unique index. When the update field of the update request includes the globally unique index, the globally unique index field, an update field value and a newly added field are spliced to form the conflict detection SQL statement. Herein, a where condition of the conflict detection SQL statement is that the globally unique index field is equal to the update field value; and the newly added field is equal to the update field value.

Herein, one globally unique index is spliced with one conflict detection SQL statement. The newly added field is a field added to a database table with a same field number and type as the globally unique index field.

In an example, when the execution result of the conflict detection SQL statement is larger than the expected value, a data rollback is performed.

Figure 3:
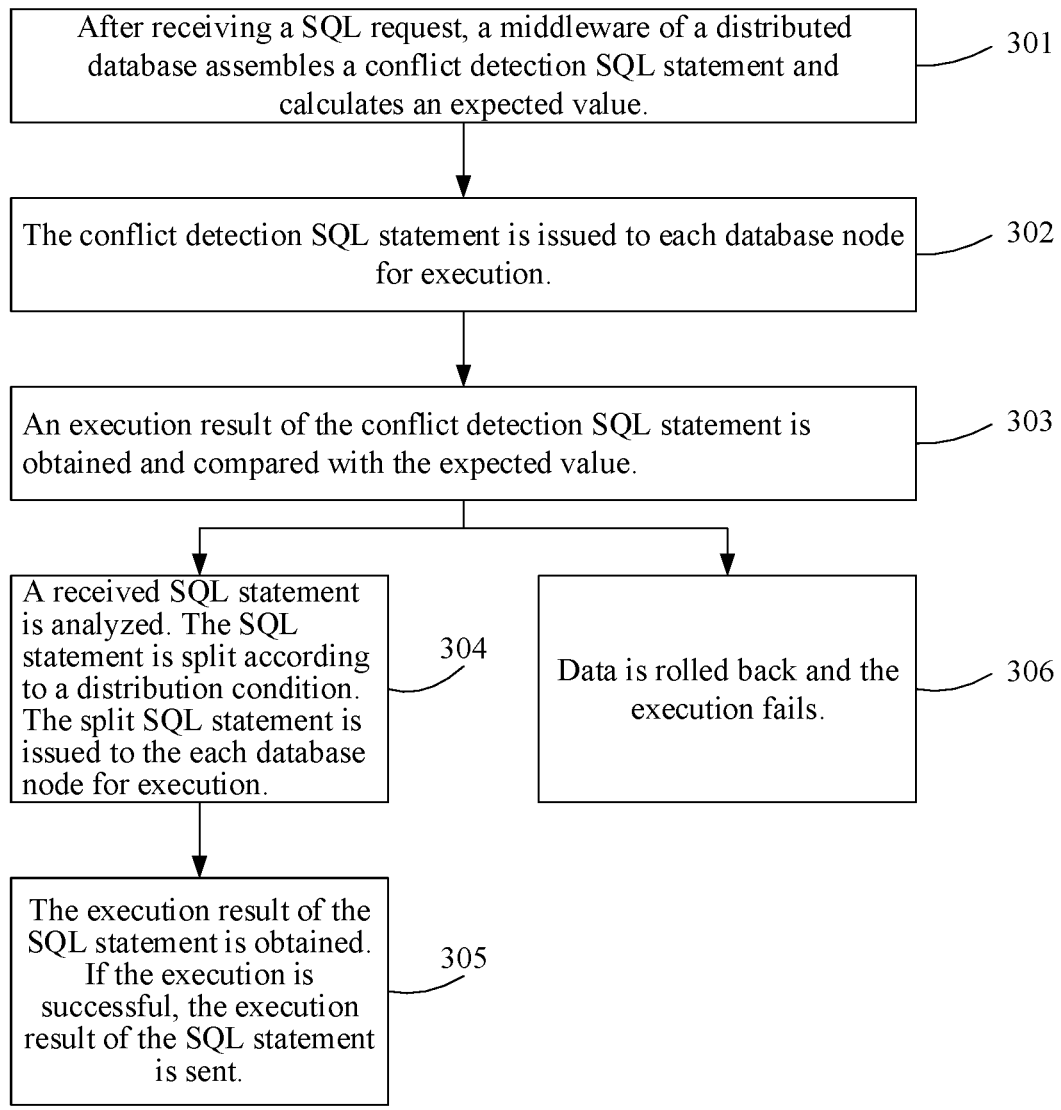
FIG. 3 is a schematic flow chart of a method for realizing a globally unique index according to another embodiment of the present disclosure.

FIG. 3 is a schematic flow chart of a method for realizing a globally unique index according to another embodiment of the present disclosure. As shown in FIG. 3, the method includes the following steps.

In step 301, after receiving a SQL request, a middleware of a distributed database assembles a conflict detection SQL statement and calculates an expected value.

Herein, an expected value of an update statement is fixed at 1, and an expected value of an insert statement is an insert record number. For example, in a statement of "insert into t1 values (1,1),(2,2)", two pieces of data are inserted into a t1 table, and an expected value of select is 2.

In step 302, the conflict detection SQL statement is issued to each database node for execution.

In step 303, an execution result of the conflict detection SQL statement is obtained and compared with the expected value.

If the execution result of the conflict detection SQL statement is less than or equal to the expected value, steps 304-305 are executed. If the execution result of the conflict detection SQL statement is greater than the expected value, step 306 is executed.

In step 304, a received SQL statement is analyzed and is split according to a distribution condition. The split SQL statement is issued to the each database node for execution.

Herein, this step may employ various splitting and issuing schemes in the existing technology.

In step 305, the execution result of the SQL statement is obtained. If the execution is successful, the execution result of the SQL statement is sent.

In step 306, data is rolled back and the execution fails.

Figure 4:
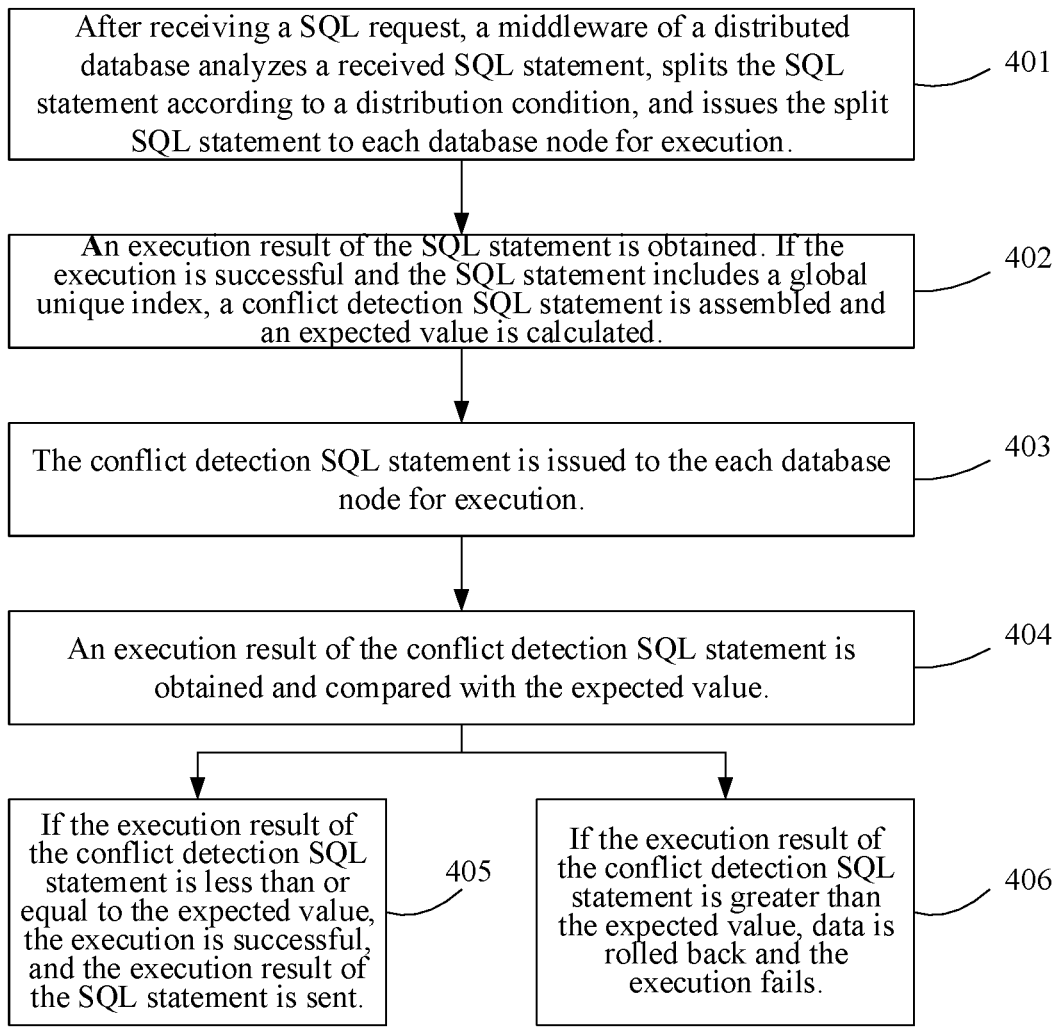
FIG. 4 is a schematic flow chart of a method for realizing a globally unique index according to another embodiment of the present disclosure.

FIG. 4 is a schematic flow chart of a method for realizing a globally unique index according to another embodiment of the present disclosure. As shown in FIG. 4, the method includes the following steps.

In step 401, after receiving a SQL request, a middleware of a distributed database analyzes a received SQL statement, splits the SQL statement according to a distribution condition, and issues the split SQL statement to each database node for execution.

Herein, this step may employ various splitting and issuing schemes in the existing technology.

In step 402, an execution result of the SQL statement is obtained. If the execution is successful and the SQL statement includes a globally unique index, a conflict detection SQL statement is assembled and an expected value is calculated.

In step 403, the conflict detection SQL statement is issued to the each database node for execution.

In step 404, an execution result of the conflict detection SQL statement is obtained and compared with the expected value.

In step 405, if the execution result of the conflict detection SQL statement is less than or equal to the expected value, the execution is successful, and the execution result of the SQL statement is sent.

In step 406, if the execution result of the conflict detection SQL statement is greater than the expected value, data is rolled back and the execution fails.

In the technical scheme provided in this embodiment, it is the middleware of the distributed database that performs a conflict detection to determine whether the data is globally unique. Specifically, after being processed by the middleware of the distributed database, the SQL statement is issued to different database nodes for execution. The database nodes can only guarantee that data of a single node does not conflict, but can not guarantee a global uniqueness. In order to perform the conflict detection, the middleware may issue the conflict detection SQL statement to the database nodes for execution, and determine whether the unique index field conflicts or not according to the execution result of the conflict detection SQL. If there is no conflict, the SQL execution is successful. If there is a conflict, the SQL execution fails.

In another embodiment of the present disclosure, a SQL statement involving insert and update that may cause conflict of the globally unique index, that is, the conflict detection SQL statement in the above embodiments, may be divided into two types.

In a first type, when a SQL statement sent by a client is an update statement, a globally unique index field of the update statement is spliced. One globally unique index is spliced with one conflict detection select statement. A where condition of the select is that the globally unique index field is equal to a field value of the update.

For example, an update process is: select 1 from 'table name' where 'unique index field 1=updated value' and 'unique index field=updated value' . . . and 'unique index field n=updated value'.

When the SQL statement sent by the client is an insert statement, a globally unique index field of the insert statement is spliced. One globally unique index is spliced with one conflict detection select statement. A where condition of the select is that the globally unique index field is equal to a field value of the insert.

For example, an insert process is: select 1 from 'table name' where ('unique index field 1=inserted value 1' and 'unique index field 2=inserted value 1' . . . and 'unique index field n=inserted value 1') or ('unique index field 1=inserted value 2' and 'unique index field 2=inserted value 2' . . . and 'unique index field n=inserted value 2') . . . or ('unique index field 1=inserted value n' and 'unique index field 2=inserted value n' . . . and 'unique index field n=inserted value n').

In a second type, in order to prevent new conflicts caused by a data rollback, a new field is added to an operation table, and the number and type of the newly added field are the same as those of the globally unique index field. During the update, values in the updated global index are recorded into the newly added field first, and then the globally unique index field is updated. During conflict detection, the values of the globally unique index field and the newly added field are simultaneously queried.

For example, an update process is: select 1 from 'table name' where ('unique index field 1=updated value' and 'unique index field=updated value' . . . and 'unique index field n=updated value') or ('newly added field 1=updated value' and 'newly added field 2=updated value' . . . and 'newly added field n=updated value').

Figure 6:
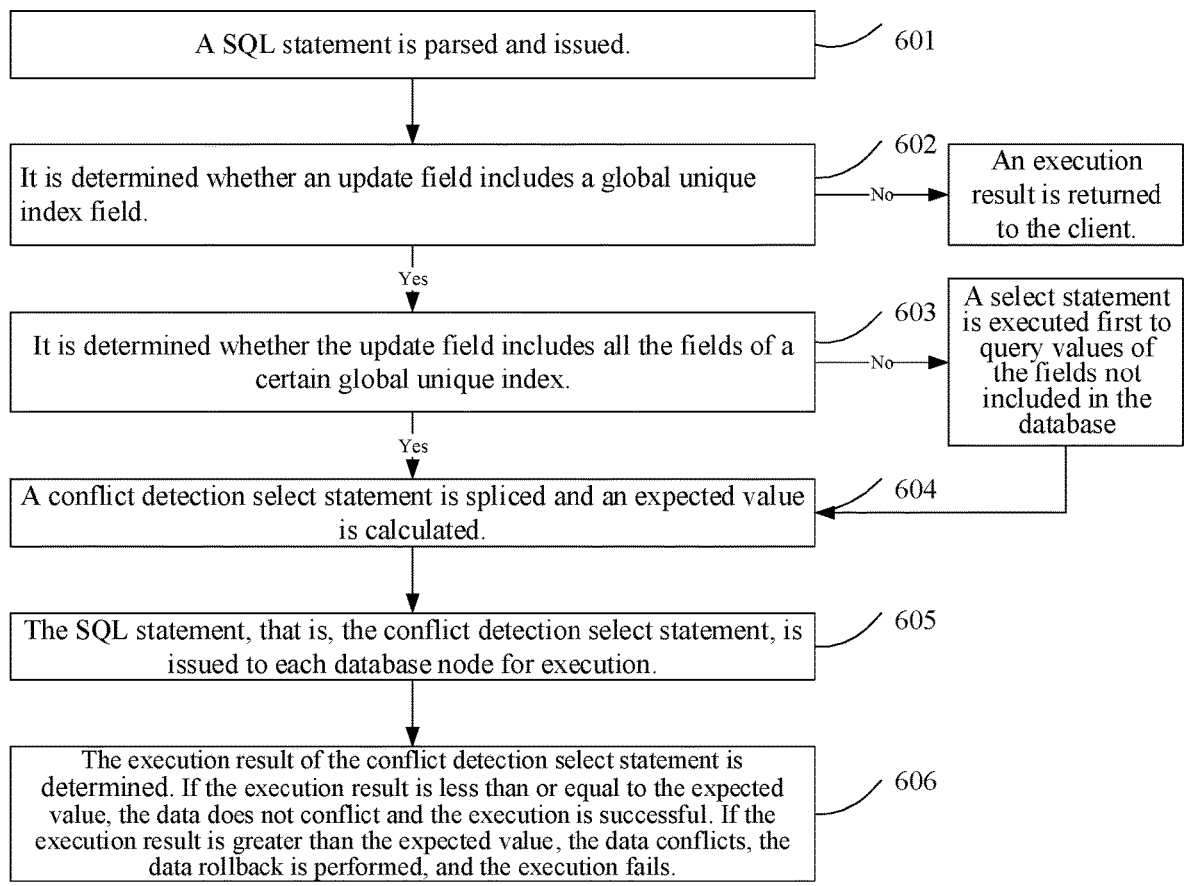
FIG. 6 is a schematic flow chart of a method for realizing a globally unique index according to another embodiment of the present disclosure.

FIG. 6 is a schematic flow chart of a method for realizing a globally unique index according to another embodiment of the present disclosure.

Figure 5:
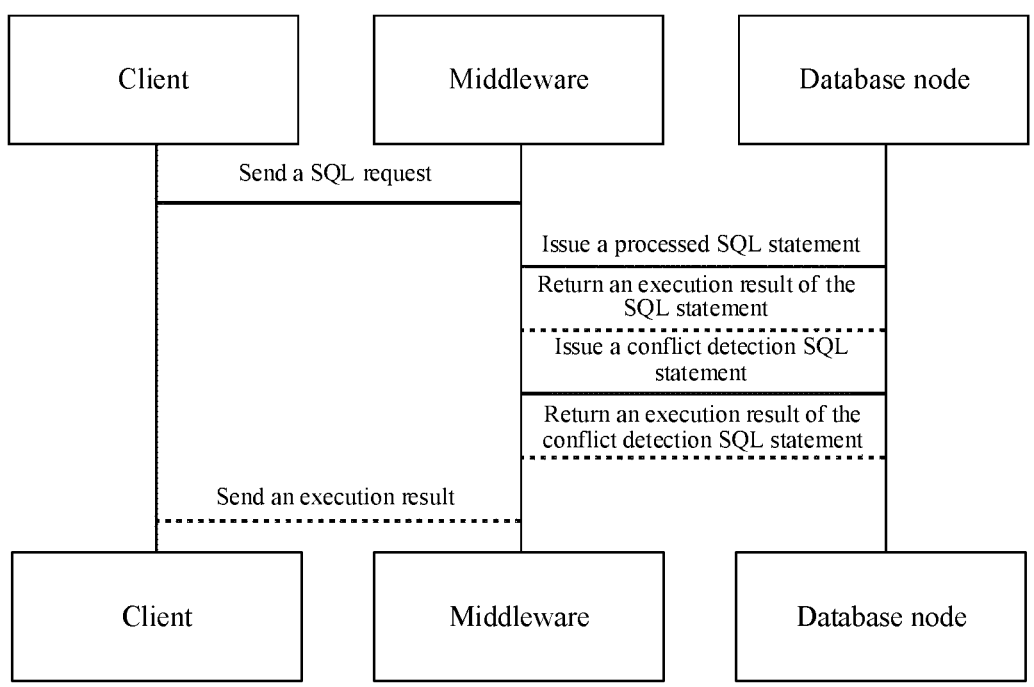
FIG. 5 is a schematic diagram of a system architecture of a distributed database according to an embodiment of the present disclosure.

This embodiment is applied to a distributed database system shown in FIG. 5. As shown in FIG. 5, a middleware of a distributed database obtains an original SQL statement sent by a client, performs operations such as parsing and splitting on the original SQL statement, and then issues the original SQL statement to each database node for execution. The each database node returns an execution result to the middleware. The middleware determines whether an update field or an insert field includes a globally unique index. If the condition is met, a conflict detection select statement is assembled, and the select statement is issued to the each database node for execution. The each database node returns an execution result of the conflict detection select statement to the middleware. The middleware determines whether there is a conflict. If there is conflict, a data rollback is performed and the execution fails. If there is no conflict, the execution is successful and the execution result is returned to the client.

In this embodiment, the original SQL statement received by the middleware is an update statement.

Specifically, as shown in FIG. 6, the method includes the following steps.

In step 601, a SQL statement is parsed and issued.

For example, after receiving a SQL request from the client, the middleware processes the original SQL statement, issues the processed original SQL statement to the each database node for execution, and then determines the execution result. If the original SQL statement is successfully executed, step 602 is executed, and if not, the execution fails.

In step 602, it is determined whether an update field includes a globally unique index field.

If the update field includes the globally unique index field, step 603 is executed. If the update field does not include the globally unique index field, the execution is successful directly, that is, the execution result is returned to the client.

In step 603, it is determined whether the update field includes all the fields of a certain globally unique index. If so, step 604 is executed, and if not, a select statement is executed first to query values of the fields not included in the database, and then step 604 is executed.

In step 604, the conflict detection select statement is spliced and an expected value is calculated.

Herein, one globally unique index is spliced with one select statement, and an expected value of each select statement is 1.

In step 605, the SQL statement, that is, the conflict detection select statement, is issued to the each database node for execution.

In step 606, the execution result of the conflict detection select statement is determined. If the execution result is less than or equal to the expected value, the data does not conflict and the execution is successful. If the execution result is greater than the expected value, the data conflicts, the data rollback is performed, and the execution fails.

According to the technical scheme provided by this embodiment, the original SQL is processed by the middleware of the distributed database, and issued to the each database node for execution according to a distribution rule. In this way, uniqueness of the data is determined by the conflict detection, thereby ensuring correctness and availability of the unique index.

Figure 7:
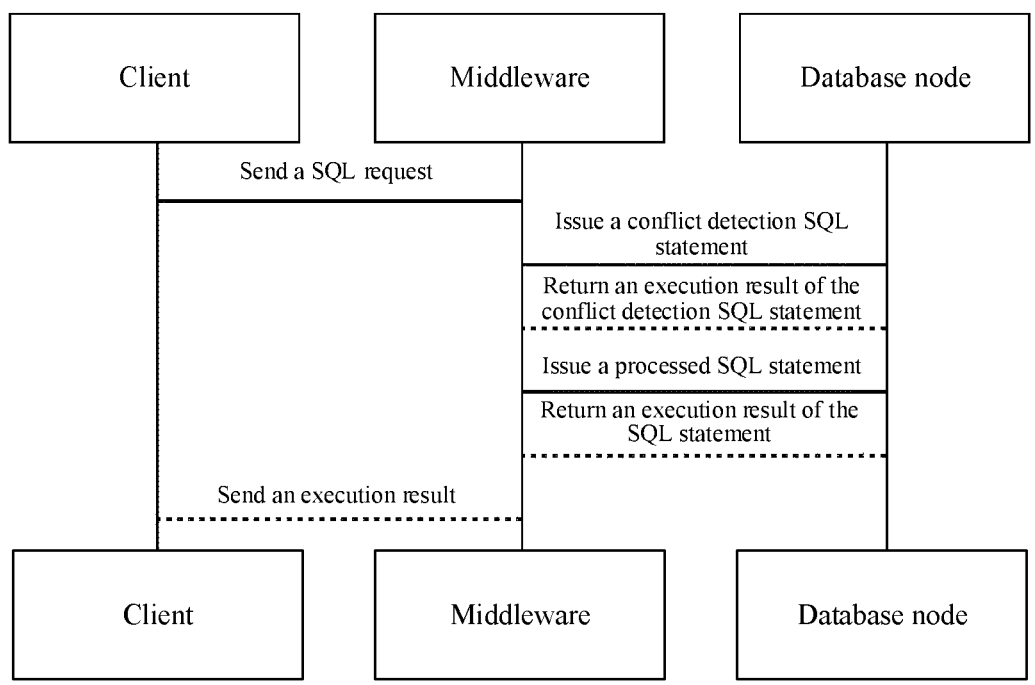
FIG. 7 is a schematic diagram of a system architecture of a distributed database according to another embodiment of the present disclosure.

In another embodiment of the present disclosure, this embodiment is applied to a distributed database system shown in FIG. 7. As shown in FIG. 7, a middleware of a distributed database obtains an original SQL statement sent by a client and assembles a conflict detection SQL statement according to the original SQL statement. The middleware issues the conflict detection SQL statement to each database node for execution, and determines an execution result of a conflict detection select statement. If the data conflicts, that is, the execution result of the conflict detection select statement is greater than an expected value, the execution fails. If the data does not conflict, that is, the execution result of the conflict detection select statement is less than or equal to the expected value, the processed SQL statement is issued to the database nodes for execution. For example, the difference from the previous embodiment is that steps 602-606 may be executed first, and then step 601 is executed when the data does not conflict. In this way, a conflict detection may be carried out in advance, and the conflict detection SQL statement is issued before the original SQL statement is executed. If there is a conflict, the execution fails. If there is no conflict, the original SQL statement is subsequently issued for execution.

Figure 8:
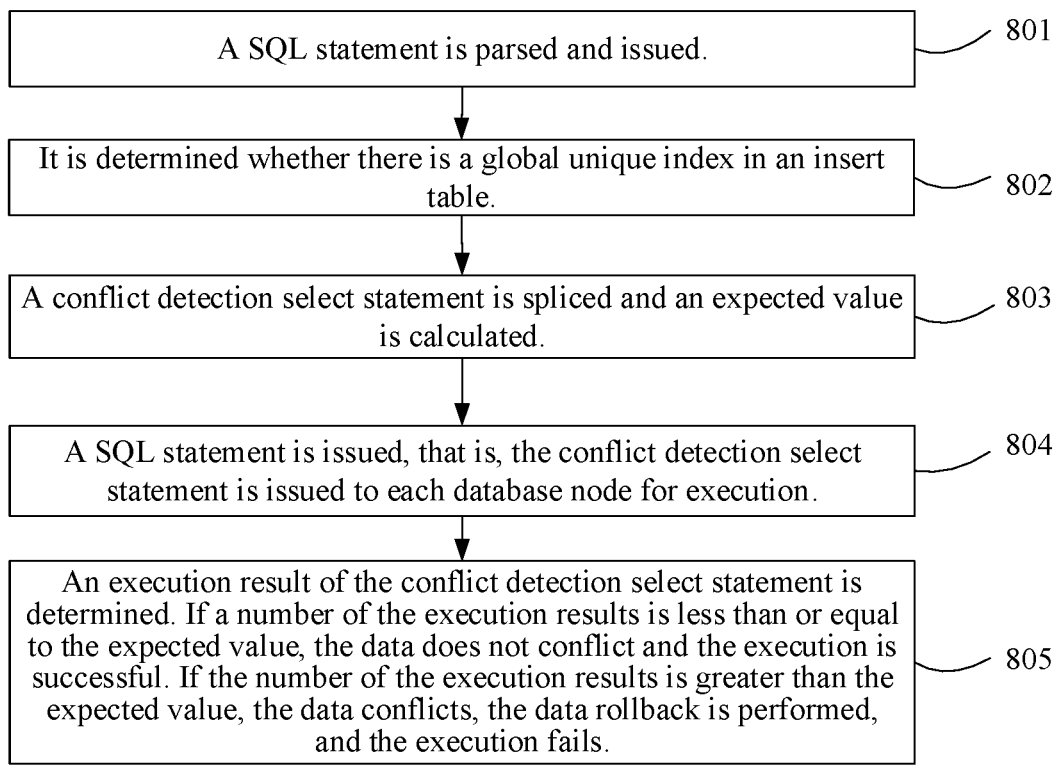
FIG. 8 is a schematic flow chart of a method for realizing a globally unique index according to another embodiment of the present disclosure.

FIG. 8 is a schematic flow chart of a method for realizing a globally unique index according to another embodiment of the present disclosure.

This embodiment is applied to a distributed database system shown in FIG. 5. As shown in FIG. 5, a middleware of a distributed database obtains an original SQL statement sent by a client, performs operations such as parsing and splitting on the original SQL statement, and then issues the original SQL statement to each database node for execution. The each database node returns an execution result to the middleware. The middleware determines whether an update field or an insert field includes a globally unique index. If the condition is met, a conflict detection select statement is assembled, and the select statement is issued to the each database node for execution. The each database node returns an execution result of the conflict detection select statement to the middleware. The middleware determines whether there is a conflict. If there is conflict, a data rollback is performed and the execution fails. If there is no conflict, the execution is successful and the execution result is returned to the client.

In this embodiment, the original SQL statement received by the middleware is an insert statement.

As shown in FIG. 8, the method includes the following steps.

In step 801, a SQL statement is parsed and issued.

For example, after receiving a SQL request from the client, the middleware processes the original SQL statement, issues the processed original SQL statement to the each database node for execution, and then determines the execution result. If the original SQL statement is successfully executed, step 802 is executed, and if not, the execution fails.

In step 802, it is determined whether there is a globally unique index in an insert table.

If there is the globally unique index, a conflict detection is required, and step 803 is executed. If there is no globally unique index, the execution is directly successful.

In step 803, the conflict detection select statement is spliced and an expected value is calculated.

Herein, one globally unique index is spliced with one select statement, and the expected value of each select statement is an insert record number.

In step 804, the SQL statement is issued, that is, the conflict detection select statement is issued to the each database node for execution.

In step 805, the execution result of the conflict detection select statement is determined. If the number of execution results is less than or equal to the expected value, then the data does not conflict and the execution is successful. If the number of execution results is greater than the expected value, then the data conflicts, the data rollback is performed, and the execution fails.

According to the technical scheme provided by this embodiment, the original SQL is processed by the middleware of the distributed database, and issued to the each database node for execution according to a distribution rule. In this way, uniqueness of the data is determined by the conflict detection, thereby ensuring correctness and availability of the unique index.

In another embodiment of the present disclosure, this embodiment is applied to a distributed database system shown in FIG. 7. As shown in FIG. 7, a middleware of a distributed database obtains an original SQL statement sent by a client and assembles a conflict detection SQL statement according to the original SQL statement. The middleware issues the conflict detection SQL statement to each database node for execution, and determines an execution result of a conflict detection select statement. If the data conflicts, that is, the execution result of the conflict detection select statement is greater than an expected value, the execution fails. If the data does not conflict, that is, the execution result of the conflict detection select statement is less than or equal to the expected value, the processed SQL statement is issued to the database nodes for execution. For example, the difference from the previous embodiment is that steps 802-805 may be executed first, and then step 801 is executed when the data does not conflict. In this way, a conflict detection may be carried out in advance, and the conflict detection SQL statement is issued before the original SQL statement is executed. If there is a conflict, the execution fails. If there is no conflict, the original SQL statement is subsequently issued for execution.

Figure 9:
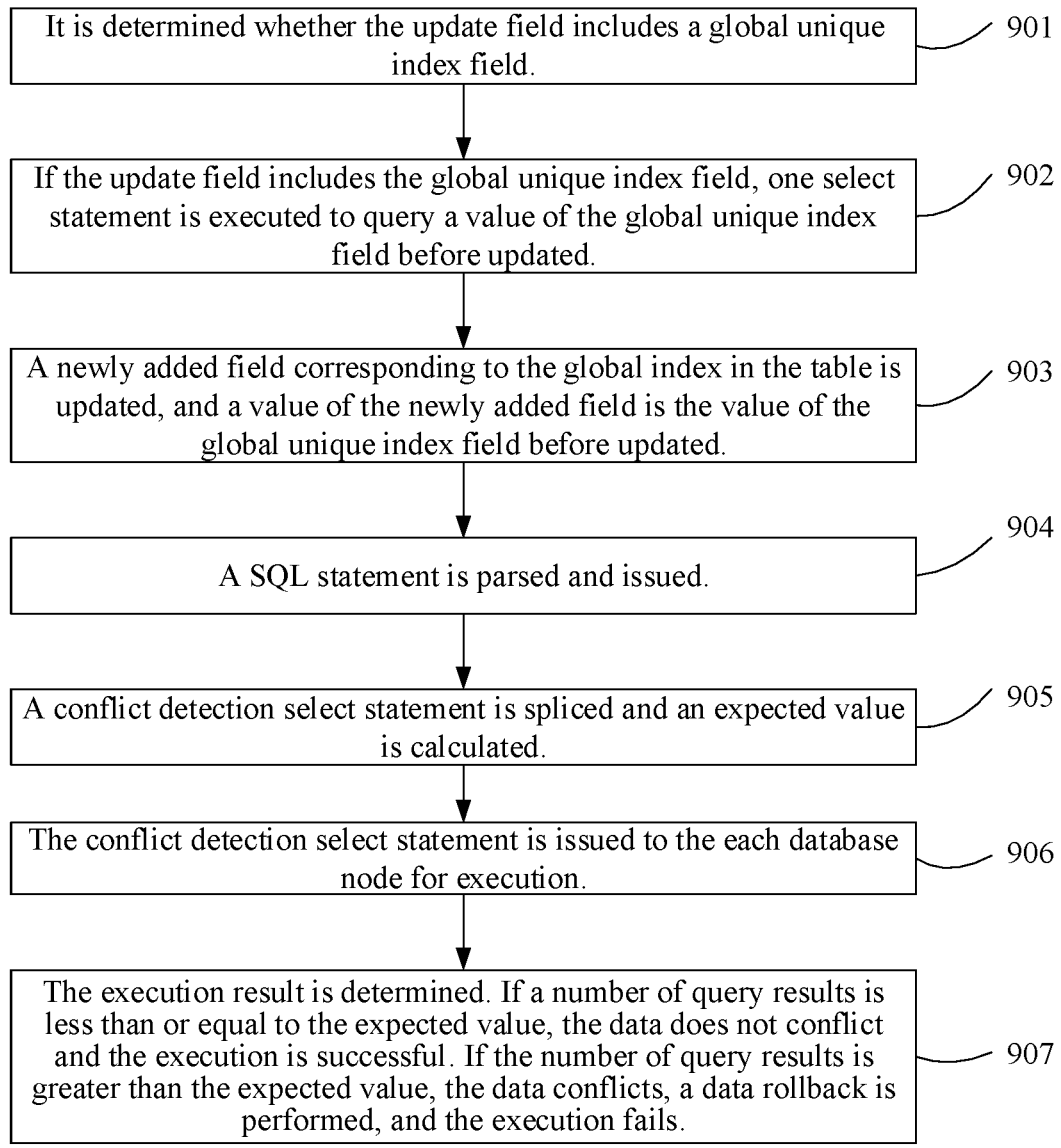
FIG. 9 is a schematic flow chart of a method for realizing a globally unique index according to another embodiment of the present disclosure.

FIG. 9 is a schematic flow chart of a method for realizing a globally unique index according to another embodiment of the present disclosure.

This embodiment is applied to a distributed database system shown in FIG. 5. As shown in FIG. 5, a middleware of a distributed database obtains an original SQL statement sent by a client, performs operations such as parsing and splitting on the original SQL statement, and then issues the original SQL statement to each database node for execution. The each database node returns an execution result to the middleware. The middleware determines whether an update field or an insert field includes a globally unique index. If the condition is met, a conflict detection select statement is assembled, and the select statement is issued to the each database node for execution. The each database node returns an execution result of the conflict detection select statement to the middleware. The middleware determines whether there is a conflict. If there is conflict, a data rollback is performed and the execution fails. If there is no conflict, the execution is successful and the execution result is returned to the client.

In this embodiment, the original SQL statement received by the middleware is an update statement, and an update table includes a newly added field.

As shown in FIG. 9, the method includes the following steps.

In step 901, it is determined whether an update field includes a globally unique index field.

In step 902, if the update field includes the globally unique index field, one select statement is executed to query a value of the globally unique index field before updated.

In step 903, the newly added field corresponding to the global index in the table is updated, and a value of the newly added field is the value of the globally unique index field before updated.

In step 904, a SQL statement is parsed and issued.

For example, after receiving a SQL request from the client, the middleware processes the original SQL statement, issues the processed original SQL statement to the each database node for execution, and then determines the execution result. If the original SQL statement is successfully executed, step 905 is executed, and if not, the execution fails.

In step 905, the conflict detection select statement is spliced and an expected value is calculated.

Herein, one globally unique index is spliced with one select statement, and an expected value of each select statement is 1.

In step 906, the conflict detection select statement is issued to the each database node for execution.

In step 907, the execution result is determined. If the number of query results is less than or equal to the expected value, the data does not conflict and the execution is successful.

If the number of query results is greater than the expected value, the data conflicts, the data rollback is performed, and the execution fails.

In another embodiment of the present disclosure, this embodiment is applied to a distributed database system shown in FIG. 7. As shown in FIG. 7, a middleware of a distributed database obtains an original SQL statement sent by a client and assembles a conflict detection SQL statement according to the original SQL statement. The middleware issues the conflict detection SQL statement to each database node for execution, and determines an execution result of a conflict detection select statement. If the data conflicts, that is, the execution result of the conflict detection select statement is greater than an expected value, the execution fails. If the data does not conflict, that is, the execution result of the conflict detection select statement is less than or equal to the expected value, the processed SQL statement is issued to the database nodes for execution. For example, the difference from the previous embodiment is that steps 905-907 may be executed first, and then step 901 is executed when the data does not conflict. In this way, a conflict detection may be carried out in advance, and the conflict detection SQL statement is issued before the original SQL statement is executed. If there is a conflict, the execution fails. If there is no conflict, the original SQL statement is subsequently issued for execution.

Figure 10:
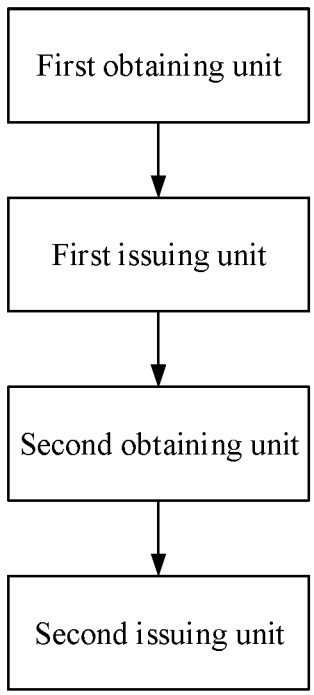
FIG. 10 is a schematic structural diagram of an apparatus for realizing a globally unique index according to an embodiment of the present disclosure.

FIG. 10 is a schematic structural diagram of an apparatus for realizing a globally unique index according to an embodiment of the present disclosure. The apparatus is applied to a distributed database, as shown in FIG. 10, and includes a first obtaining unit, a first issuing unit, a second obtaining unit and a second issuing unit.

The first obtaining unit is configured to receive a structured query language (SQL) request, obtain a conflict detection SQL statement corresponding to a SQL request and calculate an expected value.

The first issuing unit is configured to issue the conflict detection SQL statement to each database node for execution.

The second obtaining unit is configured to obtain an execution result of the conflict detection SQL statement, and compare the execution result of the conflict detection SQL statement with the expected value.

The second issuing unit is configured to process an original SQL statement of the SQL request and issue the processed original SQL statement to the each database node for execution when the execution result of the conflict detection SQL statement is less than or equal to the expected value.

In an example, obtaining the conflict detection SQL statement corresponding to the SQL request includes the following steps.

When the SQL request is an insert request, it is determined whether an insert field of the insert request includes the globally unique index. When the insert field of the insert request includes the globally unique index, a globally unique index field and an insert field value are spliced to form the conflict detection SQL statement. Herein, a where condition of the conflict detection SQL statement is that the globally unique index field is equal to the insert field value.

When the SQL request is an update request, it is determined whether an update field of the update request includes the globally unique index. When the update field of the update request includes the globally unique index, the globally unique index field and an update field value are spliced to form the conflict detection SQL statement. Herein, the where condition of the conflict detection SQL statement is that the globally unique index field is equal to the update field value.

Herein, one globally unique index is spliced with one conflict detection SQL statement.

In an example, obtaining the conflict detection SQL statement corresponding to the SQL request includes the following steps.

When the SQL request is an update request, it is determined whether an update field of the update request includes the globally unique index. When the update field of the update request includes the globally unique index, a globally unique index field, an update field value and a newly added field are spliced to form the conflict detection SQL statement. Herein, a where condition of the conflict detection SQL statement is that the globally unique index field is equal to the update field value, and the newly added field is equal to the update field value.

Herein, one globally unique index is spliced with one conflict detection SQL statement. The newly added field is a field added to a database table with a same field number and a same type as those of the globally unique index field.

In an example, the apparatus further includes a rollback unit configured to perform a data rollback when the execution result of the conflict detection SQL statement is greater than the expected value.

Figure 11:
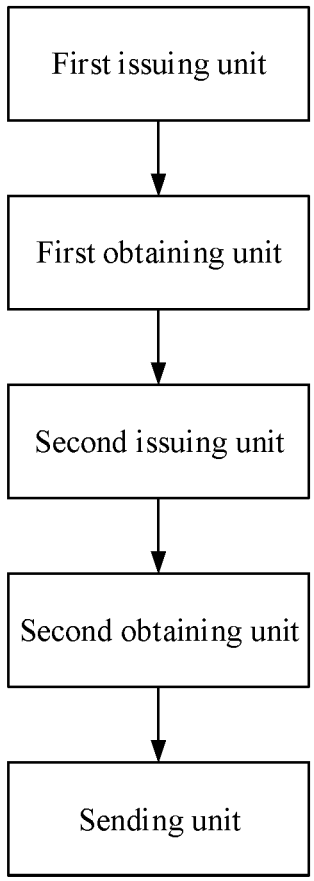
FIG. 11 is a schematic structural diagram of an apparatus for realizing a globally unique index according to another embodiment of the present disclosure.

FIG. 11 is a schematic structural diagram of an apparatus for realizing a globally unique index according to another embodiment of the present disclosure. The apparatus is applied to a distributed database, as shown in FIG. 11, and includes a first issuing unit, a first obtaining unit, a second issuing unit, a second issuing unit and a sending unit.

The first issuing unit is configured to receive a structured query language (SQL) request, process an original SQL statement of the SQL request and issue the original SQL statement to each database node for execution.

The first obtaining unit is configured to obtain an execution result of the original SQL statement and obtain the conflict detection SQL statement corresponding to the SQL request and calculate an expected value.

The second issuing unit is configured to issue the conflict detection SQL statement to each database node for execution.

The second obtaining unit is configured to obtain an execution result of the conflict detection SQL statement and compare the execution result of the conflict detection SQL statement with the expected value.

The sending unit is configured to send the execution result of the original SQL statement when the execution result of the conflict detection SQL statement is less than or equal to the expected value.

In an example, obtaining the conflict detection SQL statement corresponding to the SQL request includes the following steps.

When the SQL request is an insert request, it is determined whether an insert field of the insert request includes the globally unique index. When the insert field of the insert request includes the globally unique index, a globally unique index field and an insert field value are spliced to form the conflict detection SQL statement. Herein, a where condition of the conflict detection SQL statement is that the globally unique index field is equal to the insert field value.

When the SQL request is an update request, it is determined whether an update field of the update request includes the globally unique index. When the update field of the update request includes the globally unique index, the globally unique index field and an update field value are spliced to form the conflict detection SQL statement. Herein, the where condition of the conflict detection SQL statement is that the globally unique index field is equal to the update field value.

Herein, one globally unique index is spliced with one conflict detection SQL statement.

In an example, obtaining the conflict detection SQL statement corresponding to the SQL request includes the following steps.

When the SQL request is an update request, it is determined whether an update field of the update request includes the globally unique index. When the update field of the update request includes the globally unique index, a globally unique index field, an update field value and a newly added field are spliced to form the conflict detection SQL statement. Herein, a where condition of the conflict detection SQL statement is that the globally unique index field is equal to the update field value, and the newly added field is equal to the update field value.

Herein, one globally unique index is spliced with one conflict detection SQL statement. The newly added field is a field added to a database table with a same field number and a same type as those of the globally unique index field.

In an example, the apparatus further includes a rollback unit configured to perform a data rollback when the execution result of the conflict detection SQL statement is greater than the expected value.

Some embodiments of the present disclosure further provide an apparatus for realizing a globally unique index, which is applied to a distributed database and includes a memory, a processor and a computer program stored on the memory and operable on the processor. The computer program, when executed, causes the processor to implement the method for realizing a globally unique index described in any one of the above.

Some embodiments of the present disclosure further provide a computer-readable storage medium storing an information processing program. The information processing program, when executed, causes a processor to implement the method for realizing a globally unique index described in any one of the above.

Those having ordinary skill in the art shall understand that all or some of the steps in the method disclosed above and the functional modules/units in the system and the apparatus can be implemented as software, firmware, hardware and an appropriate combination thereof. In the hardware implementation, division between functional modules/units mentioned in the above description does not necessarily correspond to division of physical components. For example, one physical component may have multiple functions, or one function or step may by implemented by several physical components. Some physical components or all physical components may be implemented as software executed by a processor, such as a central processing unit, a digital signal processor, or a microprocessor, or may be implemented as hardware, or may be implemented as an integrated circuit, for example, an application specific integrated circuit. Such software can be distributed on a computer-readable medium, which can include a computer storage medium (or non-transitory medium) and a communication medium (or transitory medium). As well known to those having ordinary skill in the art, the term computer storage medium includes a volatile or non-volatile, removable or irremovable medium implemented in any method or technology applied to storage information (such as a computer-readable instruction, a data structure, a computer program module or other data). The computer storage medium includes, but is not limited to, a random access memory (RAM), a read-only memory (ROM), an electrically erasable programmable read only memory (EEPROM), a flash memory or other memory technology, a compact disc read-only memory (CD-ROM), a digital versatile disc (DVD) or another optical disc memory, a magnetic box, a magnetic tape, a magnetic disc or another magnetic storage apparatus, or any other medium applicable to storing desired information and accessible by a computer. In addition, as is well known to those having ordinary skill in the art, the communication medium usually includes computer-readable instructions, data structures, program modules, or other data in a modulated data signal such as a carrier wave or other transmission mechanisms, and may include any information delivery medium.

What is claimed is:

1. A method for realizing a globally unique index, applicable to a distributed database, comprising:
   receiving a structured query language (SQL) request;
   obtaining a conflict detection SQL statement corresponding to the SQL request;
   calculating an expected value;
   issuing the conflict detection SQL statement to each database node for execution;
   obtaining an execution result of the conflict detection SQL statement;
   comparing the execution result of the conflict detection SQL statement with the expected value; and
   in response to the execution result of the conflict detection SQL statement being less than or equal to the expected value, processing an original SQL statement of the SQL request, and issuing the original SQL statement to the each database node for execution,
   wherein obtaining the conflict detection SQL statement corresponding to the SQL request comprises:
   in response to the SQL request being an insert request, determining whether an insert field of the insert request includes the globally unique index, and in response to the insert field including the globally unique index, splicing a globally unique index field and an insert field value to form the conflict detection SQL statement; wherein a where condition of the conflict detection SQL statement is that the globally unique index field is equal to the insert field value; and
   in response to the SQL request being an update request, determining whether an update field of the update request includes the globally unique index, and in response to the update field including the globally unique index, splicing the globally unique index field and an update field value to form the conflict detection SQL statement; wherein the where condition of the conflict detection SQL statement is that the globally unique index field is equal to the update field value;

wherein one globally unique index is spliced with one conflict detection SQL statement.

2. The method according to claim 1, wherein obtaining the conflict detection SQL statement corresponding to the SQL request comprises:

in response to the SQL request being an update request, determining whether an update field of the update request includes the globally unique index, and in response to the update field including the globally unique index, splicing a globally unique index field, an update field value and a newly added field to form the conflict detection SQL statement; wherein a where condition of the conflict detection SQL statement is that the globally unique index field is equal to the update field value; and the newly added field is equal to the update field value;

wherein one globally unique index is spliced with one conflict detection SQL statement, and the newly added field is a field added to a database table with a same field number and a same type as those of the globally unique index field.

3. A method for realizing a globally unique index, applicable to a distributed database, comprising:

receiving a structured query language (SQL) request, processing an original SQL statement of the SQL request, and issuing the original SQL statement to each database node for execution;

obtaining an execution result of the original SQL statement, and obtaining a conflict detection SQL statement corresponding to the SQL request and calculating an expected value;

issuing the conflict detection SQL statement to each database node for execution;

obtaining an execution result of the conflict detection SQL statement, and comparing the execution result of the conflict detection SQL statement with the expected value; and in response to the execution result of the conflict detection SQL statement being less than or equal to the expected value, sending the execution result of the original SQL statement, wherein obtaining the conflict detection SQL statement corresponding to the SQL request comprises:

in response to the SQL request being an insert request, determining whether an insert field of the insert request includes the globally unique index, and in response to the insert field including the globally unique index, splicing a globally unique index field and an insert field value to form the conflict detection SQL statement; wherein a where condition of the conflict detection SQL statement is that the globally unique index field is equal to the insert field value; and in response to the SQL request being an update request, determining whether an update field of the update request includes the globally unique index, and in response to the update field including the globally unique index, splicing the globally unique index field and an update field value to form the conflict detection SQL statement; wherein the where condition of the conflict detection SQL statement is that the globally unique index field is equal to the update field value;

wherein one globally unique index is spliced with one conflict detection SQL statement.

4. The method according to claim 3, wherein obtaining the conflict detection SQL statement corresponding to the SQL request comprises:

in response to the SQL request being an update request, determining whether an update field of the update request includes the globally unique index, and in response to the update field including the globally unique index, splicing a globally unique index field, an update field value and a newly added field to form the conflict detection SQL statement; wherein a where condition of the conflict detection SQL statement is that the globally unique index field is equal to the update field value; and the newly added field is equal to the update field value;

wherein one globally unique index is spliced with one conflict detection SQL statement, and the newly added field is a field added to a database table with a same field number and a same type as those of the globally unique index field.

5. An apparatus for realizing a globally unique index, applicable to a distributed database, wherein the apparatus comprises a memory, a processor and a computer program stored on the memory and executable on the processor, and the computer program, when executed, causes the processor to implement a method for realizing a globally unique index, and the method comprises:

receiving a structured query language (SQL) request;

obtaining a conflict detection SQL statement corresponding to the SQL request;

calculating an expected value;

issuing the conflict detection SQL statement to each database node for execution;

obtaining an execution result of the conflict detection SQL statement;

comparing the execution result of the conflict detection SQL statement with the expected value; and in response to the execution result of the conflict detection SQL statement being less than or equal to the expected value, processing an original SQL statement of the SQL request, and issuing the original SQL statement to the each database node for execution, wherein obtaining the conflict detection SQL statement corresponding to the SQL request comprises:

in response to the SQL request being an insert request, determining whether an insert field of the insert request includes the globally unique index, and in response to the insert field including the globally unique index, splicing a globally unique index field and an insert field value to form the conflict detection SQL statement; wherein a where condition of the conflict detection SQL statement is that the globally unique index field is equal to the insert field value; and in response to the SQL request being an update request, determining whether an update field of the update request includes the globally unique index, and in response to the update field including the globally unique index, splicing the globally unique index field and an update field value to form the conflict detection SQL statement; wherein the where condition of the conflict detection SQL statement is that the globally unique index field is equal to the update field value;

wherein one globally unique index is spliced with one conflict detection SQL statement.

6. A non-transitory computer-readable storage medium storing an information processing program, wherein the information processing program, when executed, causes a processor to implement the method for realizing a globally unique index according to claim 1.

7. The apparatus according to claim 5, wherein obtaining the conflict detection SQL statement corresponding to the SQL request comprises:
  in response to the SQL request being an update request, determining whether an update field of the update request includes the globally unique index, and in response to the update field including the globally unique index, splicing a globally unique index field, an update field value and a newly added field to form the conflict detection SQL statement; wherein a where condition of the conflict detection SQL statement is that the globally unique index field is equal to the update field value; and the newly added field is equal to the update field value;
  wherein one globally unique index is spliced with one conflict detection SQL statement, and the newly added field is a field added to a database table with a same field number and a same type as those of the globally unique index field.

8. An apparatus for realizing a globally unique index, applicable to a distributed database, wherein the apparatus comprises a memory, a processor and a computer program stored on the memory and executable on the processor, and the computer program, when executed, causes the processor to implement the method for realizing a globally unique index according to claim 3.

9. The apparatus according to claim 8, wherein obtaining the conflict detection SQL statement corresponding to the SQL request comprises:
  in response to the SQL request being an update request, determining whether an update field of the update request includes the globally unique index, and in response to the update field including the globally unique index, splicing a globally unique index field, an update field value and a newly added field to form the conflict detection SQL statement; wherein a where condition of the conflict detection SQL statement is that the globally unique index field is equal to the update field value; and the newly added field is equal to the update field value;
  wherein one globally unique index is spliced with one conflict detection SQL statement, and the newly added field is a field added to a database table with a same field number and a same type as those of the globally unique index field.

10. A non-transitory computer-readable storage medium storing an information processing program, wherein the information processing program, when executed, causes a processor to implement the method for realizing a globally unique index according to claim 3.

* * * * *